(12) United States Patent
Levy-Abegnoli et al.

(10) Patent No.: US 7,272,653 B2
(45) Date of Patent: Sep. 18, 2007

(54) SYSTEM AND METHOD FOR IMPLEMENTING A CLUSTERED LOAD BALANCER

(75) Inventors: Eric Levy-Abegnoli, Valbonne (FR); Pascal Thubert, La Colle sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 1299 days.

(21) Appl. No.: 09/963,737

(22) Filed: Sep. 26, 2001

(65) Prior Publication Data

US 2002/0040402 A1 Apr. 4, 2002

(51) Int. Cl.
*G06F 15/16* (2006.01)

(52) U.S. Cl. ..................................... 709/229

(58) Field of Classification Search .............. 709/207, 709/232, 224, 226, 229, 238; 342/359; 370/316; 711/152
See application file for complete search history.

(56) References Cited

U.S. PATENT DOCUMENTS

| | | | | |
|---|---|---|---|---|
| 6,078,957 A | * | 6/2000 | Adelman et al. | 709/224 |
| 6,260,120 B1 | * | 7/2001 | Blumenau et al. | 711/152 |
| 6,441,782 B2 | * | 8/2002 | Kelly et al. | 342/359 |
| 6,775,692 B1 | * | 8/2004 | Albert et al. | 709/207 |
| 6,801,949 B1 | * | 10/2004 | Bruck et al. | 709/232 |
| 2001/0043574 A1 | * | 11/2001 | Nguyen et al. | 370/316 |

OTHER PUBLICATIONS

Goldszmidt G. S. "Load Management for Scaling Up Internet Services", IEEE Network Operation and Management Symposium US New York, NY, IEEE vol. conf. 10, pp. 828-835, Feb. 15, 1998.*

* cited by examiner

*Primary Examiner*—Andrew Caldwell
*Assistant Examiner*—Kelvin Lin
(74) *Attorney, Agent, or Firm*—Joscelyn G. Cockburn; Dillon & Yudell LLP (57) ABSTRACT

A system and method of organizing a front-end load balancing function for implementing an Internet site so the transmission control protocol (TCP) connections, established between the front-end load balancing function and end-users, are spread over more than one individual load balancer (ILB). Each ILB consistently self-asserts a primary ILB owner for each one of the TCP connections. Hence, each ILB, for each delegated TCP connection can process each TCP connection on behalf of the load balancing function while handing off the other TCP connections to the corresponding ILB owners. Also, each ILB consistently self-asserts a backup ILB owner for each one of the TCP connections so the designated back up ILB owner takes over the processing of an ILB owned TCP connection should the ILB owner become incapable of processing the delegated TCP connection.

12 Claims, 7 Drawing Sheets

SYSTEM AND METHOD FOR IMPLEMENTING A CLUSTERED LOAD BALANCER

BACKGROUND OF THE INVENTION

1. Technical Field

The present invention relates generally to the global Internet network and more particularly to the Internet servers of World Wide Web (WWW) sites organized as a cluster or group of servers forming a single entity and equipped with a front-end load balancer.

2. Description of the Related Art

Internet servers supporting critical applications such as e-commerce, financial transactions, database access, corporate intranets, and other key functions are committed to run twenty-four hours a day. An important consideration is the scalability of performance to handle large volumes of client requests without creating unwanted delays. To cope with these requirements, server clustering combined with load balancing, is the standard solution adopted by all service providers. Hence, web sites are organized as a cluster of servers. These clusters are built from a group of independent servers and are managed as a single system. To be defined as a cluster of servers, two or more connected servers are run with cluster management software aimed at providing services such as failure detection, recovery, load balancing, and the ability to manage the servers as a single system. Indeed, server clustering provides a number of important benefits. These benefits include: improved availability, easier maintainability, and cost-effective scalability. Load balancing is especially essential for scaling the performance of a server enabling a fair distribution of client requests across multiple servers within the cluster. Therefore, if an individual server fails, the load balancing mechanism dynamically redistributes the load among the remaining servers. Load balancing is used to enhance scalability, which improves throughput while keeping response times low. When more traffic must be handled, this is simply achieved by adding computers to the cluster as necessary without having to interrupt the service provided by the site.

A number of load balancing methods exist. The use of the domain name system (DNS), the on-line distributed data base system used to map human-readable machine names into IP addresses, permits an implementation of a popular, yet rudimentary, solution for enabling a limited form of load balancing for a cluster of servers. Because this solution uses DNS to map incoming IP requests to a defined server (or set of servers) in a round robin fashion, it does not function effectively as a high availability solution. In the event of a server failure, round robin DNS keeps forwarding requests to the failed server until it is manually removed from the DNS.

To overcome this problem, hardware load-balancers typically use a technique called Network Address Translation (NAT), which exposes a single cluster IP address to clients and manages to transparently forward data for the individual servers by translating Internet protocol (IP) addresses and re-sending network packets. Hence, this technique encounters the serious drawback of creating a single point of failure between the cluster and the clients. A backup load balancer becomes necessary, but this adds complexity and requires time for the backup to be activated in the event of an emergency. And, despite the fact hardware load-balancers are intrinsically fast, address translation imposes an overhead, which limits the bandwidth.

Software-based load balancing products, which employ various dispatching models for load balancing, face the same disadvantages. Whether implemented by NAT or with other methods (such as hypertext transfer protocol (HTTP) redirects), software-based products also introduce an overhead which limits throughput and restricts performance to an even greater extent. Despite whether a front end load balancing is implemented in hardware or software, the throughput of the entire cluster becomes bounded by the speed and processing power of the sole dispatching function placed in front of the individual servers.

Therefore, despite all of the advantages resulting from the implementation of an Internet server under the form of a cluster of individual servers, the front-end load balancer become a bottleneck in the system. This configuration does not scale well and becomes a single point of failure.

SUMMARY OF THE INVENTION

It is therefore one object of the present invention to provide an improved system and method of implementing a cluster of individual servers.

It is another object of the present invention to provide an improved system and method of implementing a load balancing function as a front end to a cluster of individual servers while fully preserving the scalability and availability otherwise brought by the use of multiple servers.

It is yet another object of the present invention to implement a front end dispatching function that is distributed over more than one device so the front end dispatching function is no longer a single point of failure. This also warrants that the performance can be scaled to cope with traffic increases.

Further objects, features and advantages of the present invention will become apparent to the ones skilled in the art upon examination of the following description in reference to the accompanying drawings. It is intended that any additional advantages be incorporated herein.

A system and method are disclosed for enabling a front-end load balancing function to a cluster of servers that implement an Internet site for end-users. The transmission control protocol (TCP) connections established between the front-end load balancing function and the end-users are spread by a front-end load balancing function over multiple individual load balancers (ILB). The invention enables each ILB to consistently self-assert, for the front-end load balancing function, a primary ILB owner for each one of the TCP connections. Hence, each ILB processes each delegated TCP connection on behalf of the load balancing function and sends all other TCP connections to the corresponding ILB owners. Also, each ILB can consistently self-assert a backup ILB owner for each one of the TCP connections so the designated back up ILB owner takes over the processing of an ILB owned TCP connection if the ILB owner becomes inactive or incapable of processing the TCP connection.

Thus, the present invention allows the implementation of a load balancing function as a front end to a cluster of individual servers while fully preserving scalability and availability brought by the use of a cluster of individual servers. Because it is distributed over more than one device, the load balancing function is no longer a single point of failure and can also scale well to cope with traffic increase.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
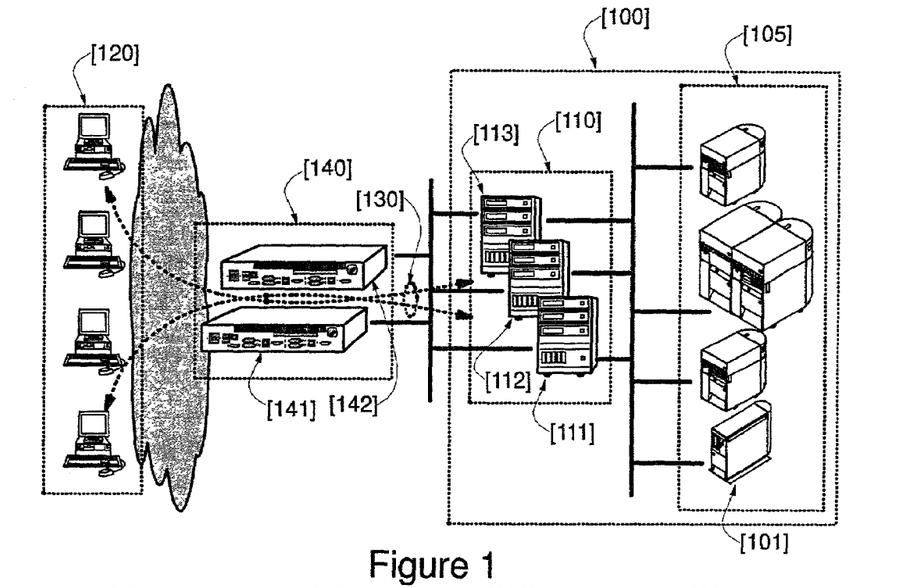
FIG. 1 depicts an overview of an internet site in accordance to a preferred embodiment of the present invention.

FIG. 1 depicts a preferred embodiment of the present invention through an illustration of an Internet site server 100 based on a cluster of individual servers 105, and a cluster of load balancers that includes multiple individual load balancers 110.

This method of organization guarantees a redundancy in the servers. This method of organization also insures that the front end load balancing function, carried out over multiple individual load balancers are cooperating to dispatch the workload resulting from client requests. The site's reliability increases since the load balancing function is no longer a single point of failure. Moreover, the site is easily maintainable and scalable if more client requests must be accommodated. Both individual servers 101 and front end load balancing performance can be incrementally increased to cope with more requests and more traffic coming from site server end-users 120. As a result, end-users 120 may establish transmission control protocol/internet protocol (TCP/IP) connections 130 with global load balancing function 110 still exposing a single internet protocol (IP) address for the cluster and the whole site.

Also illustrated in FIG. 1, a collection of front-end networking hardware 140 is responsible for forwarding the traffic to the cluster of load balancers. This may include IP routers and/or switches. The present invention does not require a single front end router or a switch in charge of forwarding the IP packets to the load balancers. The present invention also does not require that the same algorithm be used in all of the load balancers.

Therefore, the present invention manages to organize a cluster of individual load balancers 110 to exclusively share a set of active transmission control protocol (TCP) connections 130, established at any given instant with end-users 120. This is done through a protocol, discussed in detail in the rest of the description, which enables individual load balancers 111-113 to maintain state information about the other load balancers, and to share the active TCP/IP connection space so that each individual load balancer eventually is designated part of the connection. Moreover, the present invention allows hot insertion or removal of individual load balancers for easy reconfiguration and maintenance.

Figure 2:
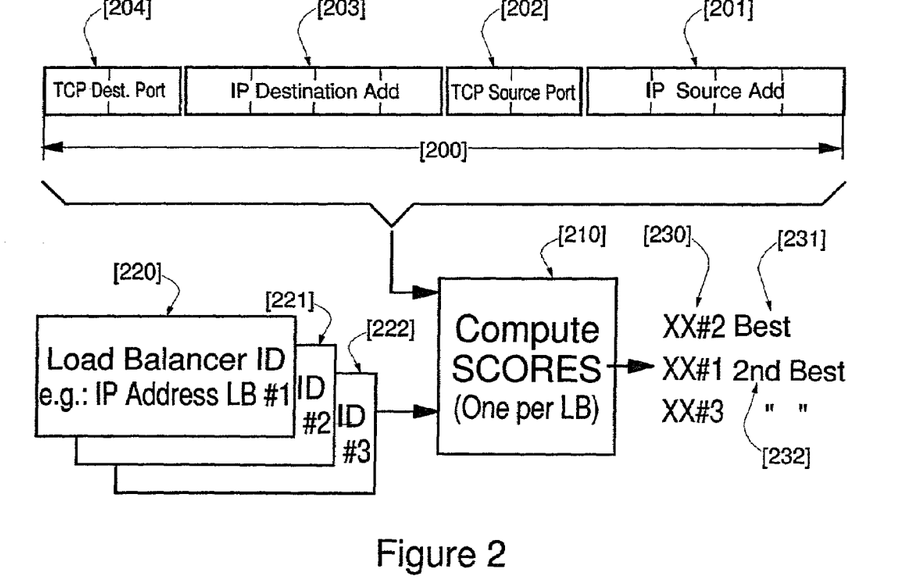
FIG. 2 illustrates how an individual load balancer (ILB) owner and a backup ILB owner are assigned for handling a TCP connection in accordance to a preferred embodiment of the present invention.

FIG. 2 depicts a definition of a TCP connection established by the transport protocol of the TCP/IP suite of protocols. A TCP/IP connection is completely and uniquely identified by a twelve byte quadruplet 200. This twelve byte quadruplet includes a four byte IP source address 201, four byte IP destination address 203, a two byte TCP source port 202, and a two byte destination port 204. Each connection of the TCP/IP connection space, handled by a load balancing function, can be uniquely referenced by this twelve byte code.

As illustrated in FIG. 1, the present invention assumes that the TCP connection space must be partitioned over all individual load balancers, so that they can unambiguously handle their own exclusive share of the TCP connection space. A preferred approach to determine each load balancer's current share of the TCP connection space includes relaying to each individual load balancer that receives a TCP packet a twelve byte code 200 of the connection, and computing a score, as referred to in step 210, which includes a unique identifier (ID) of the load balancer in the cluster (step 220).

Also, the actual individual load balancer that receives the TCP packet is also aware of all the other ID's of the load balancers in the cluster (step 221). The number of scores computed (step 230) depends on the number of individual load balancers. The individual load balancer with the 'best' score is designated as the primary owner (step 231) of the connection. The individual load balancer with the second best score (step 232) becomes the backup owner for that connection should the load balancer designated as the primary owner fails or becomes inactive. This is further discussed in the rest of the description.

Hence, if an individual load balancer receives a packet that does not belong to its own share of the connection space the individual load balancer merely forwards the packet to the primary owner of the partition. What is considered as the 'best' score for such a score is highly dependent upon the particular method used to compute the scores. However, the present invention does assume that scores can be definitively ranked, so that a 'best' score and a 'second best' score (step 231) can be used to designate which individual load balancers are the owners and backup owners of the connection.

The load balancer ID merely needs to be unique within the cluster. It can be any ID or serial number designated by the administrator of the site. Another preferred embodiment of the present invention utilizes the IP address of the individual load balancers, as shown in step 220, since the IP addresses are unique.

Figure 3:
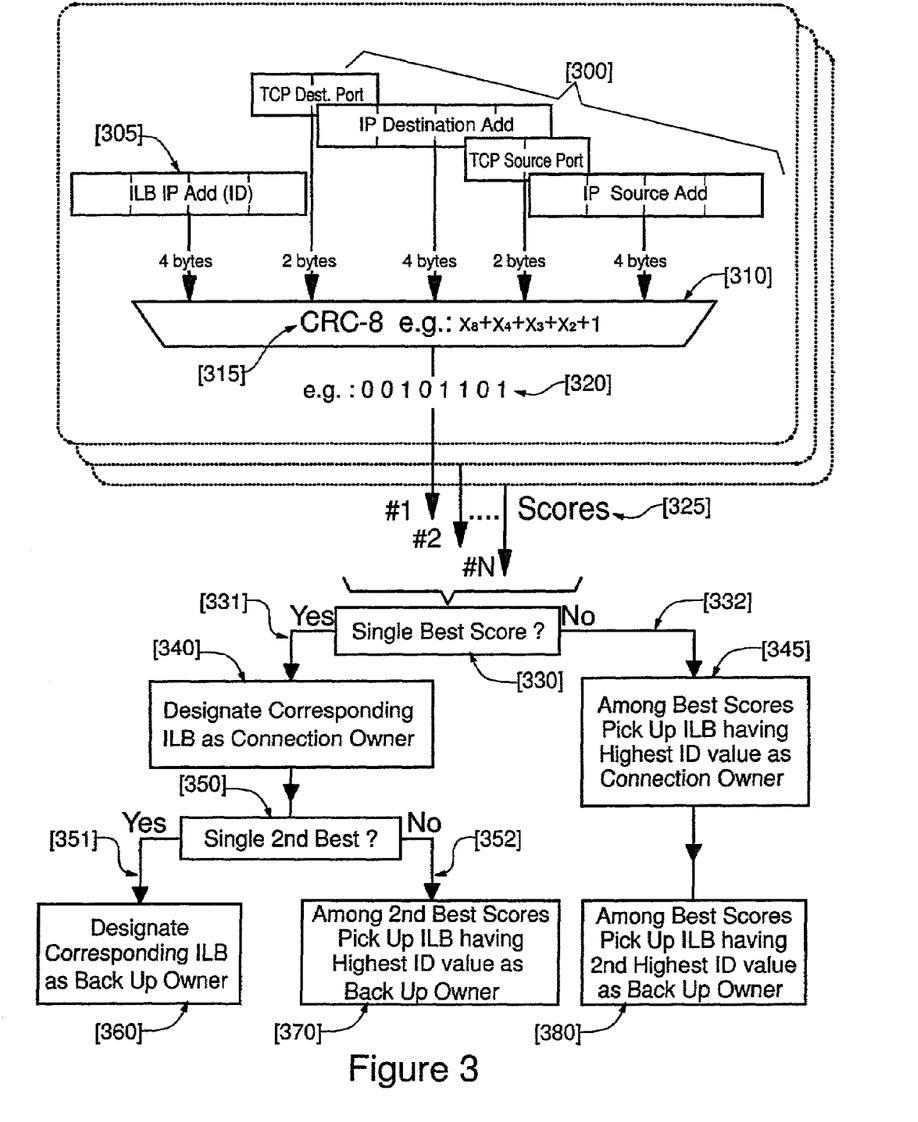
FIG. 3 depicts, in detail, a preferred method for assigning a primary ILB owner and a backup ILB owner to a TCP connection in accordance to a preferred embodiment of the present invention.

A score can be computed using techniques and methods well-known in the art, as depicted in FIG. 3. Any method that permits an establishment of a unique correspondence between an individual load balancer and a particular TCP connection is sufficient for performing the task of splitting the set of active TCP connections over the cluster of load balancers. If the load balancers of the cluster have the same performance ratings, any one of the individual load balancers could be designated as the primary owner of the available TCP connection. On the contrary, if the cluster of load balancers includes load balancers with different performance ratings, a more sophisticated method may be required to bias the scores in relationship with the performance and capacities of the individual load balancers. Scores may be computed so that a more powerful load balancer is more likely to be selected than the other load balancers, as depicted in step 210.

Finally, front-end routers or switches, as illustrated in FIG. 1, may become active participants in the distribution of the traffic over the cluster of load balancers 110. If the present invention does not assume that the front-end equipment need to be actually aware of the cluster behavior, traffic can merely be distributed in, for example, a straightforward round-robin fashion. In another preferred embodiment of the present invention, front end networking equipment 140 is programmed or adapted to intelligently pre-dispatch the traffic over the cluster of load balancers 110 to ease the workload. This may avoid the re-sending of TCP connections to individual load balancers that are not designated as the primary owner of the connection. This is achievable provided that the front-end networking equipment somehow acquires some information about the protocol of the present invention utilized by the load balancers to share the connection space. Then, all participating individual load balancers can make the same decision on any entering packet.

FIG. 3 depicts a preferred method of computing scores for a TCP connection so that the TCP connection can unambiguously be assigned to an individual load balancer of a cluster designated as the primary owner of the TCP connection. The twelve byte vector representing TCP connection 300 is used along with the identification (ID) 305 of the Individual Load Balancer (ILB) as an input for a standard Cyclic Redundancy Checking (CRC) calculation (step 310), which utilizes a polynomial (in this example, of the eighth degree 315). The result of this calculation is an eight bit binary vector 320, with 128 possible values (0-127). A randomized short digest of the sixteen byte vector is obtained. Many other methods well known in the art are possible, including those using one-way hash functions or various kinds of random generators often utilized in cryptography. However, the CRC computing method is a simple and sufficient method for equally spreading the set of connections over the load balancers. Hence, scores are computed in as depicted in step 325, for each ILB belonging to a cluster of load balancers. Then, a primary owner and a backup owner for the connection must be chosen. If there is a single best score, the corresponding ILB is designated as the primary owner of the connection (step 340). Similarly, if there is a single second best score (step 351) the corresponding ILB is designated as the backup owner of the connection (step 360). However, if several second best scores have been computed (step 325) the ILB having the highest ID value is designated as the backup owner (step 370). If there is not a single best score, the primary owner of the connection, picked among the ones having the same best scores, becomes the ILB with the highest ID value (step 345). The backup owner is the ILB with the second highest ID value (step 380).

Another preferred embodiment of the present invention involves a case where individual load balancers must be assigned a share of the connection space in proportion to their relative performance. Computed scores are biased towards the load balancers that have the ability to handle a larger load. This can be simply achieved by multiplying the scores, as illustrated in step 325, by a value corresponding to their relative weights.

FIG. 4 illustrates the overall forwarding process performed by each ILB cluster member within the cluster of load balancers when receiving TCP packets. This process assumes that each cluster member continues to update a lookup table of owned connections (LTOC) 402 that holds a list of connections assigned to each load balancer. A least recently used (LRU) Cache 404 is also implemented in a preferred embodiment of the present invention. LRU Cache 404 keeps track of all the associations between a connection and the server assigned to handle the connection formed by the other members of the cluster. It should be readily apparent to ones skilled in the art that this cache information must be monitored so that a connection entry not addressed for an extended period of time is automatically removed from the cache 404. Another preferred embodiment of the present invention, which does not require a cache 404, is depicted in FIG. 5.

Figure 4A:
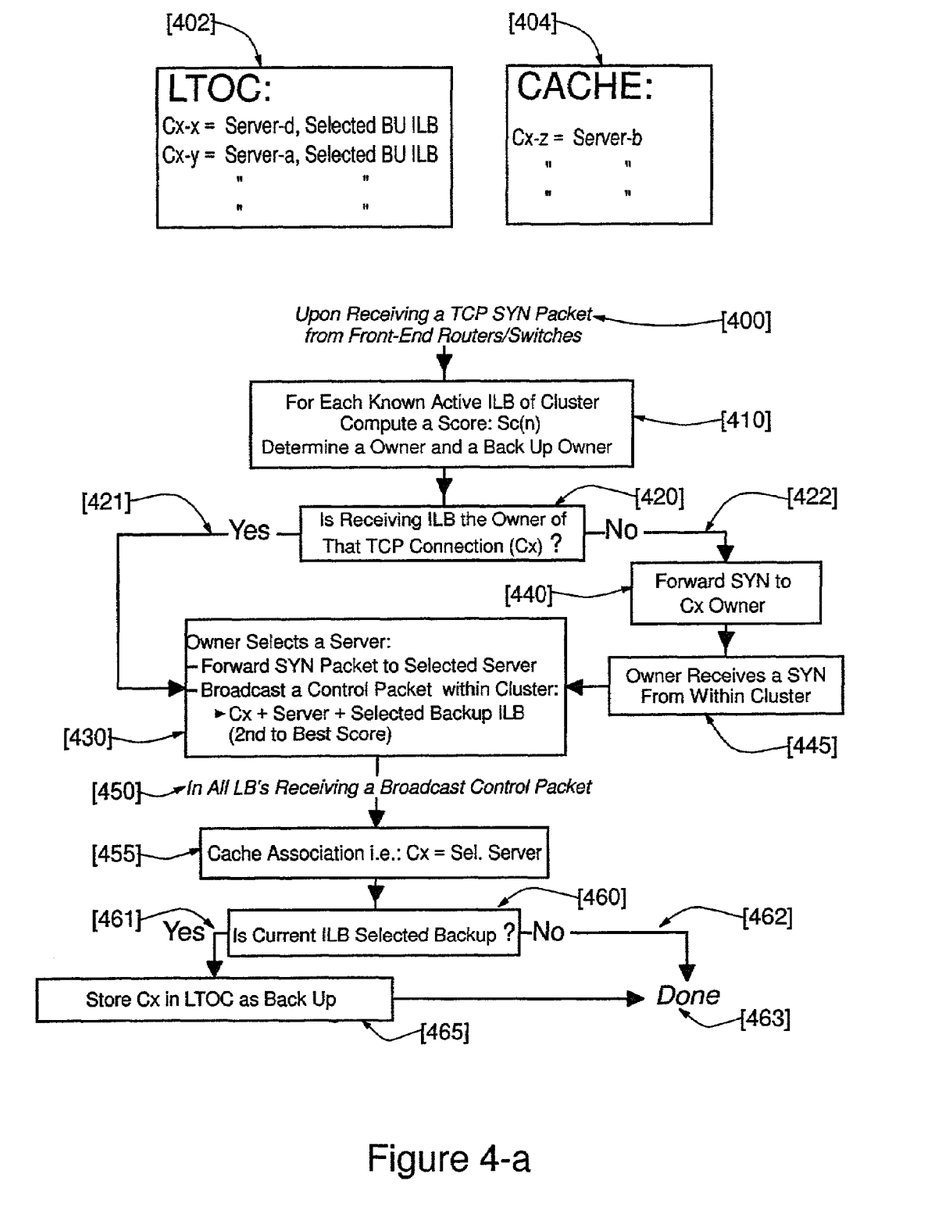
FIG. 4 illustrates how TCP packets are processed when received by a load balancing function in accordance to a preferred embodiment of the present invention.
Figure 5:
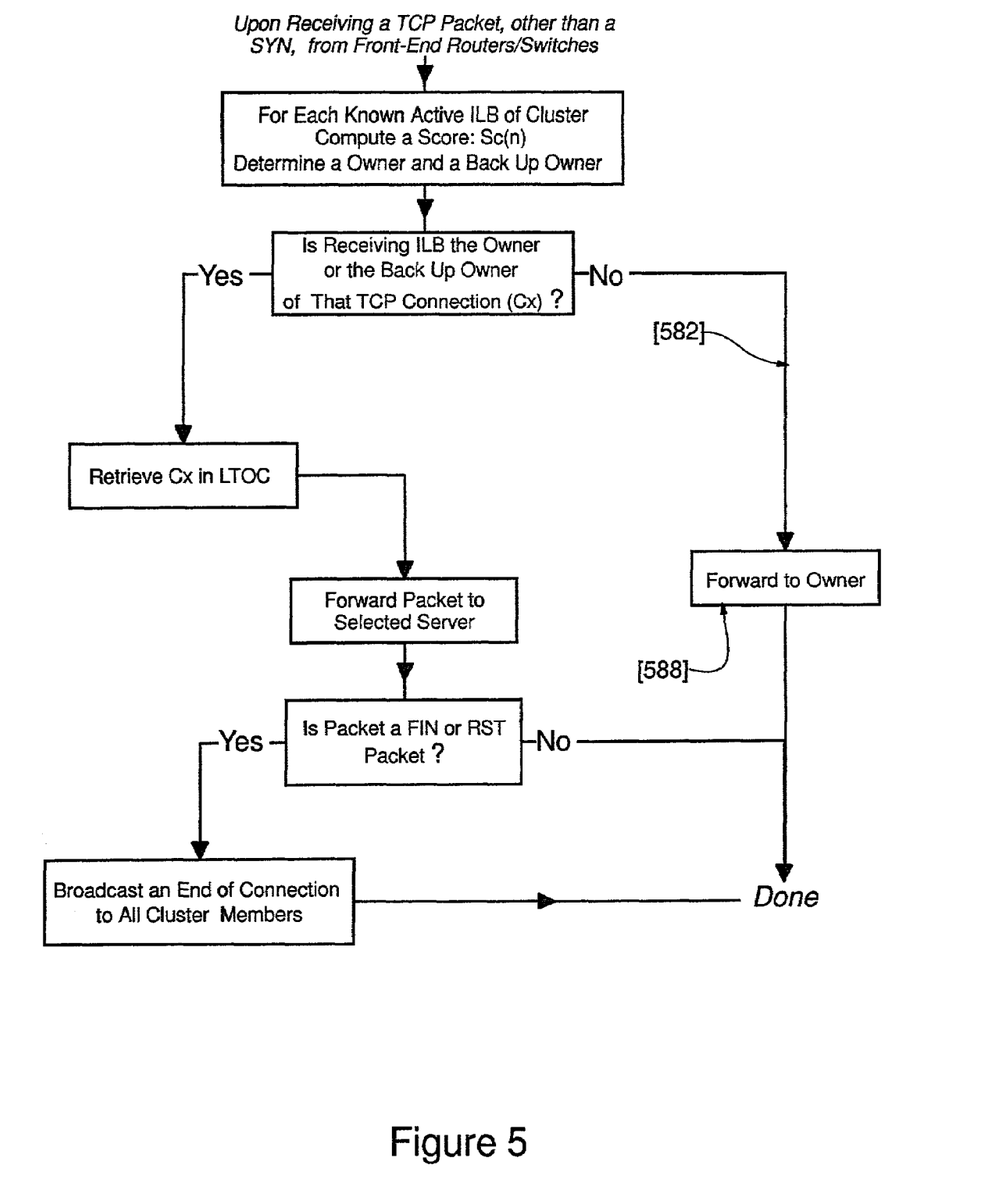
FIG. 5 depicts a case where an ILB does not implement a cache in accordance to a preferred embodiment of the present invention.

FIG. 4a illustrates a procedure, according to a preferred embodiment of the present invention that is followed whenever a synchronous idle character (SYN) packet is received (step 400). A SYN packet is the starting point when establishing a new TCP connection. Then, the individual load balancer delegates the primary owner and backup for the new connection, as depicted in step 410, through the computation of scores as depicted in previous figures. If a receiving load balancer becomes the primary owner of the connection (step 421) by obtaining the best score, the receiving load balancer selects a backup individual server (step 430) among a cluster of available servers 105, as illustrated in FIG. 1, from which the new TCP/IP connection will be served and forwards the chosen server the received SYN packet. Also, a control packet is broadcast within the cluster so that all members are notified about the newly formed association. This control packet includes the connection (Cx), the server actually serving the connection, and the selected backup load balancer (LB). Also, as depicted in FIG. 1, front end networking devices 140 may relay information about the new association that has been made by the load balancer owner of the connection. However, as illustrated in step 422, the SYN packet is forwarded to the primary owner of the connection (step 440) which proceeds directly to the step depicted in step 440, where the SYN packet is received from another cluster member by the designated primary owner (step 445) and may proceed directly to step 430 as described. Then, all individual load balancers receiving the control packet issued at step 430 must store in cache 404 the newly formed association, or the correspondence between the connection and the selected server. Moreover, the individual load balancer, elected as the backup owner of the connection in step 461, must store the correspondence between the connection and the selected server in step 465 in its LTOC 402. Then, the process ends in step 463.

Figure 4B:
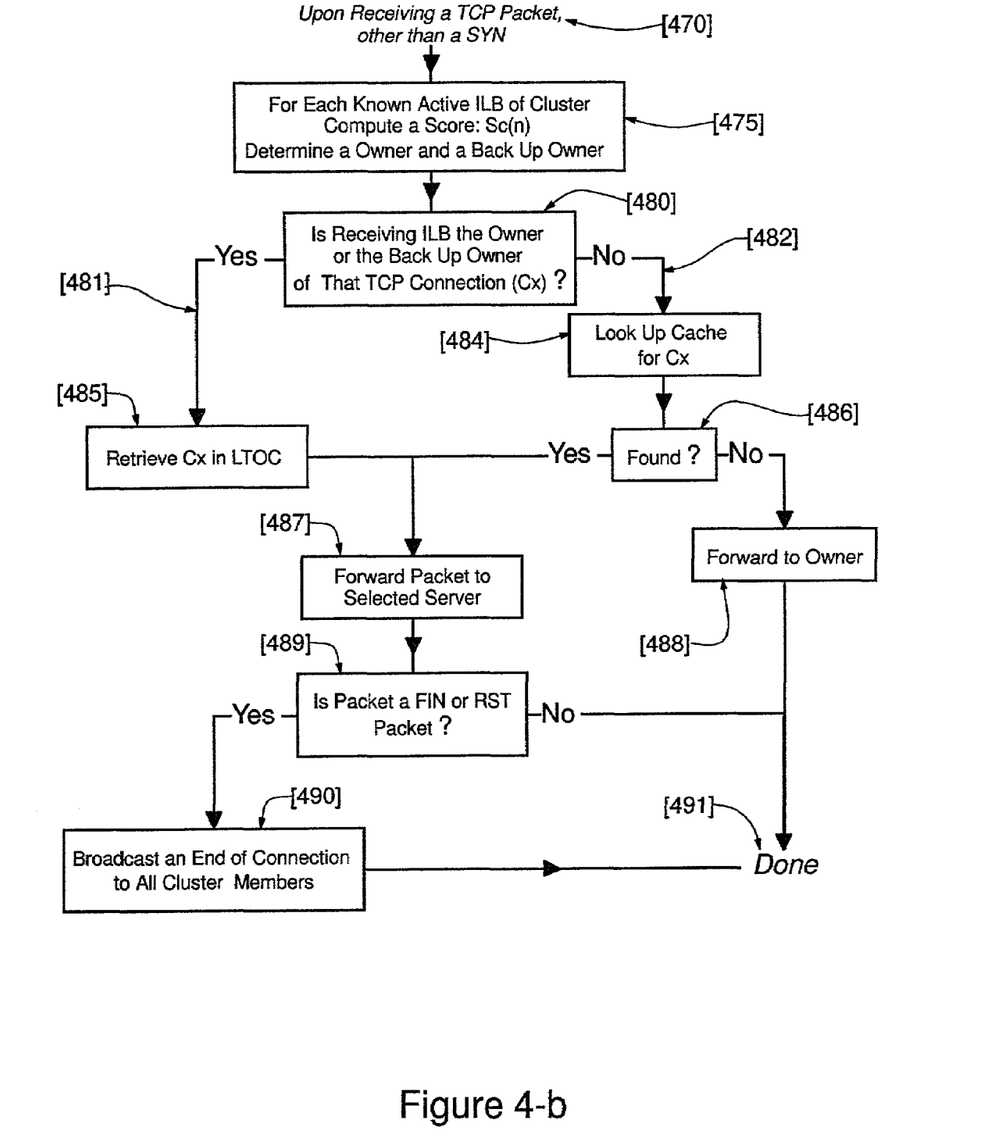

FIG. 4b depicts the part of the process that deals with the forwarding of every other TCP packet but the SYN (step 470). As with SYN packets, scores are computed, as depicted in step 475, to determine a primary owner and a backup owner of the connection. If the receiving LB is indeed either the primary owner or the backup owner of the connection (step 480), the corresponding entry is entered, as illustrated in step 485, in its LTOC. The packet is forwarded, as depicted in step 487, directly to the selected server for processing. However, if the packet is further tested (step 489) and found to be a finish (FIN) or reset (RST) TCP packet, an end of connection is detected which triggers the broadcasting of this information to all members of the cluster (step 490) so the other members can update their own tables. If the packet is an intermediate packet, the procedure ends in step 491.

The cache is searched in step 484 if the receiving ILB is not the primary owner or the back up owner of the TCP connection. If the connection is found in step 486, the corresponding connection information is retrieved and the same process can be performed according to the previous description. Hence, steps 487, 489, and 490 remain the same regardless of the previous outcome.

If the connection is not found at step 486 because the cache is not current, the packet is forwarded without modifications to the LB primary owner of the connection so that the appropriate LB owner can process the information. This ends, in step 491, this part of the forwarding process.

FIG. 5 illustrates another preferred embodiment of the present invention where the forwarding process depicted in FIG. 4b is modified to take into account the case where LB's do not implement a caching scheme.

Whenever a received packet belongs to a connection for which the receiving LB is neither the primary owner nor the backup owner (step 582), the received packet must be unconditionally sent to the appropriate LB primary owner of the connection (step 588) for processing. Although this does not otherwise affect the functionality of the cluster, this has the obvious inconvenience of impeding the forwarding process and limiting the overall performance of the load balancing function. Since all intermediate packets may have to be forwarded while a connection is active, the intermediate packets cannot be handled directly by a load balancer that is not the designated primary owner of the connection.

Also, in another preferred embodiment of the present invention, the part of the forwarding process depicted in FIG. 4a must omit the step depicted in step 455 since the association, cannot be stored in cache 404.

The present invention does not require that individual load balancers be identical. Some may be equipped with a cache while others do not have caching capability.

Figure 6:
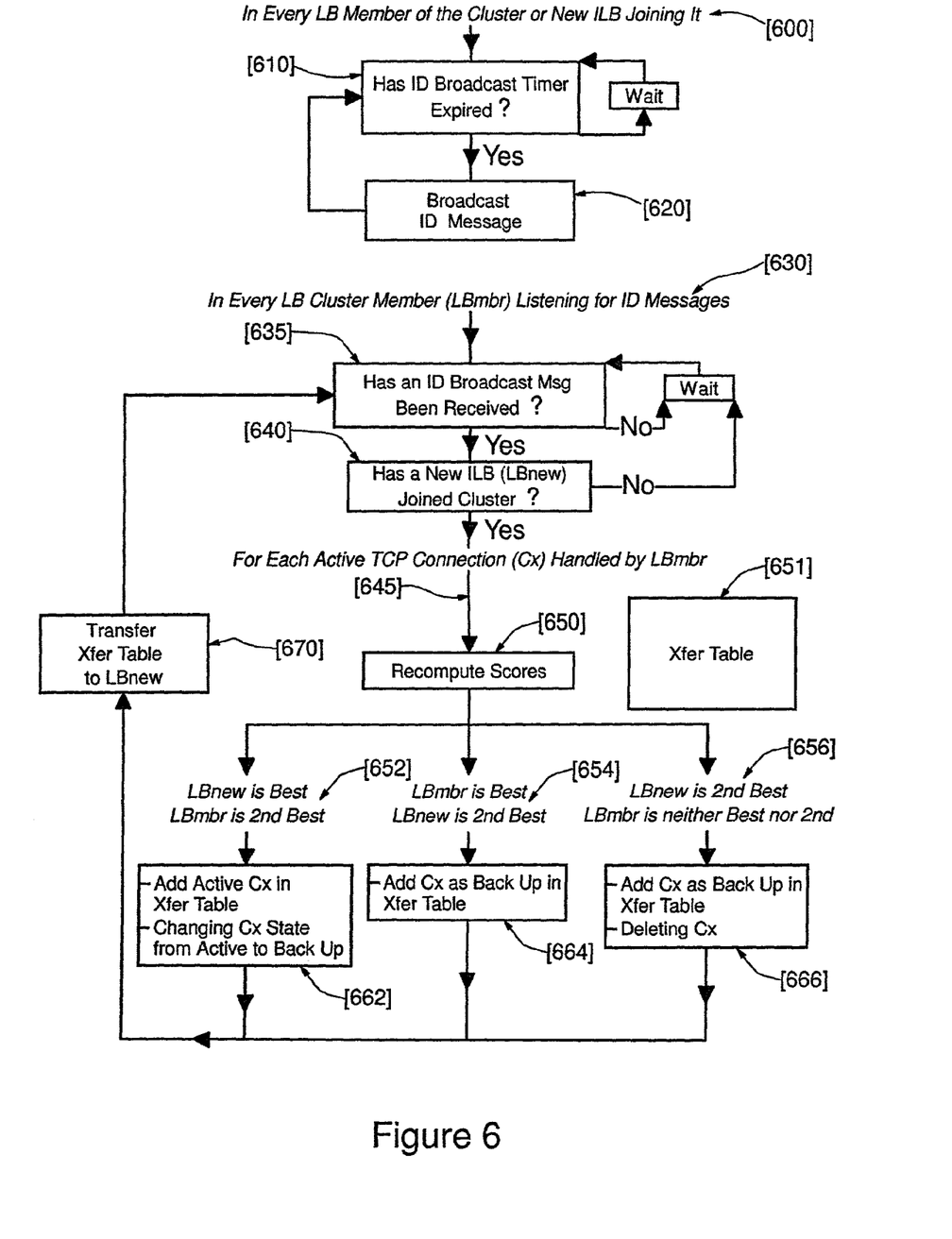
FIG. 6 illustrates a preferred method of adding a new ILB to the front-end load balancing function in accordance to a preferred embodiment of the present invention.
Figure 7:
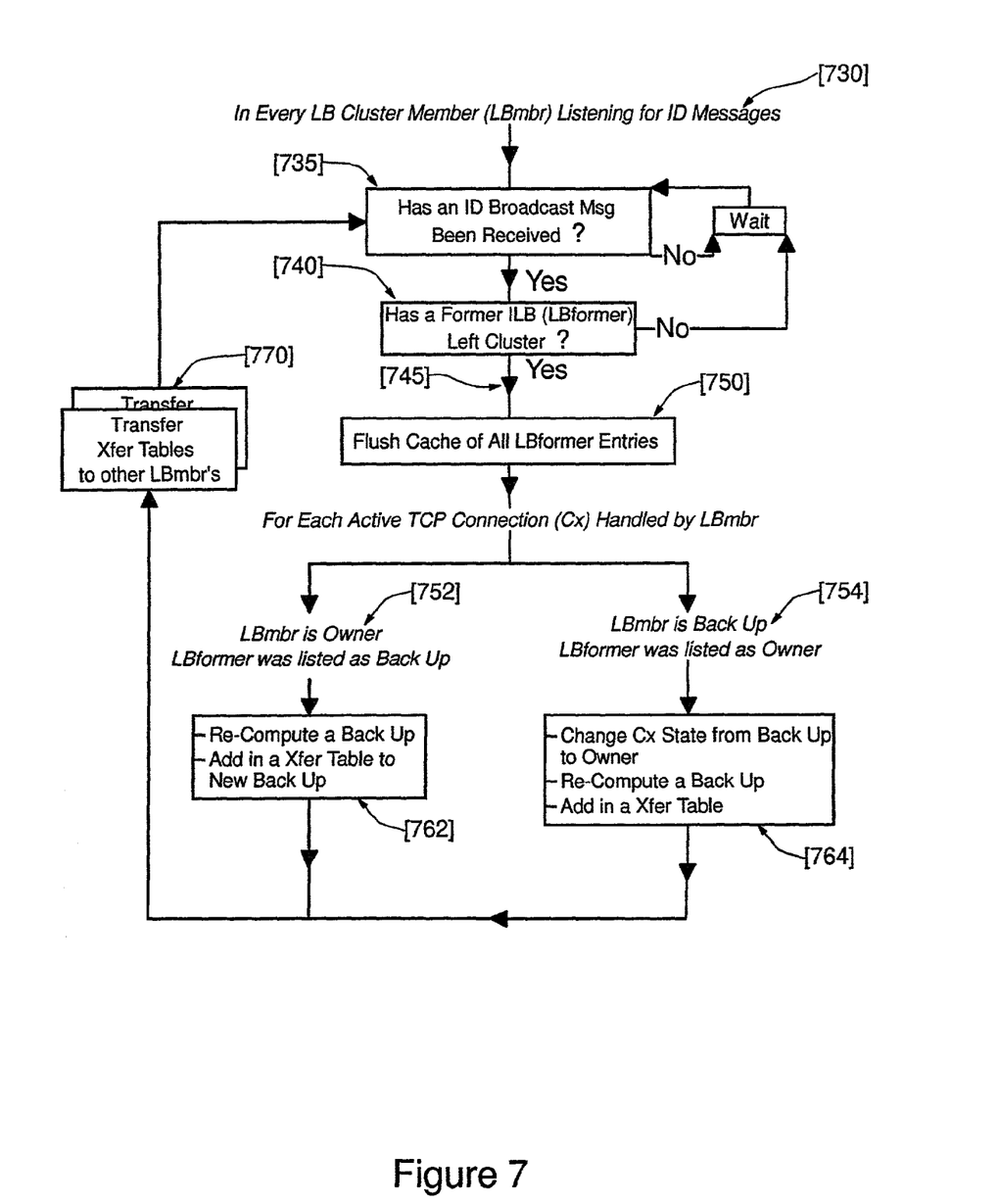
FIG. 7 depicts a preferred method of removing an ILB to the front-end load balancing function in accordance to a preferred embodiment of the present invention.

FIG. 6 depicts a case when a new individual load balancer is added to the cluster. When a new individual load balancer is added, or removed as illustrated in FIG. 7, the present invention assumes that, as illustrated in step 620, ID messages are regularly broadcast by each member of cluster 600 so they can be updated on the status of the other members of cluster 600. At a predetermined time interval, messages are sent between the load balancers (step 610). Then, every member of cluster 600 can determine if a new load balancer has been added by receiving the periodic ID messages. When a new load balancer is added, each TCP connection is delegated to a cluster member in step 645, and the scores are re-computed (step 650) to take into account the new configuration of load balancers. For each active TCP connection three different situations can be encountered. The first case occurs when the new load balancer becomes the primary owner of the connection while another cluster member is elected as the backup owner (step 652). In this case, a transfer table, prepared (step 651) while scores are re-computed, is updated with the information indicating that the connection is now delegated to the new load balancer. Also, the LTOC of the backup cluster member is updated in step 662. A second case (step 654) occurs when the cluster member remains the primary owner of the connection and the new load balancer becomes the new backup owner. Then, the transfer table is updated accordingly, as depicted in step 664. In a third case, the new load balancer is elected as back up owner while cluster member is no longer the primary owner or the backup owner of the connection. Then, the transfer table is updated accordingly and the connection must be removed from the cluster member's LTOC (step 666). Finally, after all connections have been deleted, the transfer table is sent to the new load balancer, as illustrated in step 670, so as it can start processing its share of the reassigned active TCP connections. This must be done through the use of a reliable protocol, such as TCP (the reliable transport protocol of the TCP/IP suite of protocols) to ensure that all LTOC's are updated with the right information and remain consistent within the cluster.

FIG. 7 illustrates a case when an individual load balancer is removed from the cluster. When this occurs (step 745), the process continues to step 750, where cache 404 is flushed of all references to the removed load balancer (LBformer) so that packets received for a connection cannot be misdirected. Then, for each active TCP connection handled by the cluster member, two different situations can be encountered. The first (step 752) involves the connections designated to the load balancer cluster member (Lbmbr) and for which LBformer was the backup, a new backup is reassessed and a transfer table destined for the new backup is updated accordingly, as shown in step 762. The second situation (step 754) corresponds to the case where LBmbr is the backup owner where Lbformer was the primary owner. In this case, the connection state in LBmbr is updated and LBmbr is now the new delegated primary owner of the connection, while a new backup must be designated. Like in the previous case, a transfer table destined for the new back up is updated accordingly (step 754). After all connections have been deleted, transfer tables are sent to the ILB's concerned by the changes made in step 770.

When an ILB (LBformer) becomes inactive or is removed from the cluster, remaining active ILB's, that were formerly the backup owners for the connections owned by LBformer, become the new delegated owners. Meanwhile, new backup ILB's are reassessed for each affected connection. ILB's communicate through the sending and reception of transfer tables.

While the invention has been particularly shown and described with reference to a preferred embodiment, it will be understood by those skilled in the art that various changes in form and detail may be made therein without departing from the spirit and scope of the invention.

What is claimed is:

1. A method of load balancing connections between a plurality of servers and a plurality of clients, wherein a plurality of load balancers couple said plurality of servers and said plurality of clients, said method comprising:

in response to a receiving load balancer out of said plurality of load balancers receiving a communication from at least one of said plurality of clients, determining a primary load balancer and a backup load balancer for handling said communication;

storing an identity of said primary load balancer and said backup load balancer corresponding to said communication in each of said plurality of load balancers;

forwarding said communication to said primary load balancer for transmission to at least one of said plurality of servers; and in response to determining said primary load balancer is not available, forwarding said communication to said determined backup load balancer for transmission to at least one of said plurality of servers.

2. The method of claim 1, wherein said determining further includes:

calculating a plurality of scores, wherein each of said plurality of scores corresponds to a respective one of said plurality of load balancers;

ranking said plurality of scores from a highest score to a lowest score;

designating as said primary load balancer one of said plurality of load balancers corresponding to said highest score; and designating as said backup load balancer one of said plurality of load balancers corresponding to a second highest score.

3. The method of claim 1, further comprising:
in response to determining said receiving load balancer is said primary load balancer, transmitting said communication to at least one of said plurality of servers.

4. A system for load balancing connections between a plurality of servers and a plurality of clients, said system comprising:
a plurality of load balancers, including
a receiving load balancer, further including:
means for receiving a communication from at least one of said plurality of clients;
means for determining said primary load balancer and said backup load balancer for handling said communication;
means for storing an identity of said primary load balancer and said backup load balancer corresponding to said communication in each of said plurality of load balancers;
means for forwarding said communication to said primary load balancer for transmission to at least one of said plurality of servers; and
means for forwarding said communication to said determined backup load balancer for transmission to at least one of said plurality of servers, in response to determining said primary load balancer is not available.

5. The system of claim 4, wherein said receiving load balancer further includes:
means for determining said primary load balancer and said backup load balancer for handling said communication by calculating a plurality of scores, wherein each of said plurality of scores corresponds to a respective one of said plurality of load balancers;
means for ranking said plurality of scores from a highest score to a lowest score;
means for designating as said primary load balancer one of said plurality of load balancers corresponding to said highest score; and
means for designating as said backup load balancer one of said plurality of load balancers corresponding to a second highest score.

6. The system of claim 4, wherein said receiving load balancer further includes:
means for transmitting said communication to at least one of said plurality of servers, in response to determining said receiving load balancer is said primary load balancer.

7. A load balancer out of a plurality of load balancers for load balancing connections between a plurality of servers and a plurality of clients, said load balancer comprising:
means for receiving a communication from at least one of said plurality of clients;
means for determining a primary load balancer and a backup load balancer for handing said communication;
means for storing an identity of said primary load balancer and said backup load balancer corresponding to said communication in each of said plurality of load balancers;
means for forwarding said communication to said primary load balancer for transmission to at least one of said plurality of servers; and
means for forwarding said communication to said determined backup load balancer for transmission to at least one of said plurality of servers, in response to determining said primary load balancer is not available.

8. The load balancer of claim 7, further comprising:
means for calculating a plurality of scores, wherein each of said plurality of scores corresponds to a respective one of said plurality of load balancers;
means for ranking said plurality of scores from a highest score to a lowest score;
means for designating as said primary load balancer one of said plurality of load balancers corresponding to said highest score; and
means for designating as said backup load balancer one of said plurality of load balancers corresponding to a second highest score.

9. The load balancer of claim 7, further comprising:
means for transmitting said communication to at least one of said plurality of servers, in response to determining said load balancer is said primary load balancer.

10. A computer program product for load balancing connections between a plurality of servers and a plurality of clients, wherein a plurality of load balancers couple said plurality of servers and said plurality of clients, said computer program product comprising:
instructions, stored on computer-readable media, for determining a primary load balancer and a backup load balancer for handling said communication, in response to a receiving load balancer out of said plurality of load balancers receiving a communication from at least one of said plurality of clients;
instructions, stored on computer-readable media, for storing an identity of said primary load balancer and said backup load balancer corresponding to said communication in each of said plurality of load balancers;
instructions, stored on computer-readable media, for forwarding said communication to said primary load balancer for transmission to at least one of said plurality of servers; and
instructions, stored on computer-readable media, for forwarding said communication to said determined backup load balancer for transmission to at least one of said plurality of servers, in response to determining said primary load balancer is not available.

11. The computer program product of claim 10, further comprising:
instructions, stored on computer-readable media, for calculating a plurality of scores, wherein each of said plurality of scores corresponds to a respective one of said plurality of load balancers;
instructions, stored on computer-readable media, for ranking said plurality of scores from a highest score to a lowest score;
instructions, stored on computer-readable media, for designating as said primary load balancer one of said plurality of load balancers corresponding to said highest score; and
instructions, stored on computer-readable media, for designating as said backup load balancer one of said plurality of load balancers corresponding to a second highest score.

12. The computer program product of claim 10, further comprising:
instructions, stored on computer-readable media, for transmitting said communication to at least one of said plurality of servers, in response to determining said receiving load balancer is said primary load balancer.

* * * * *